Figure 1:
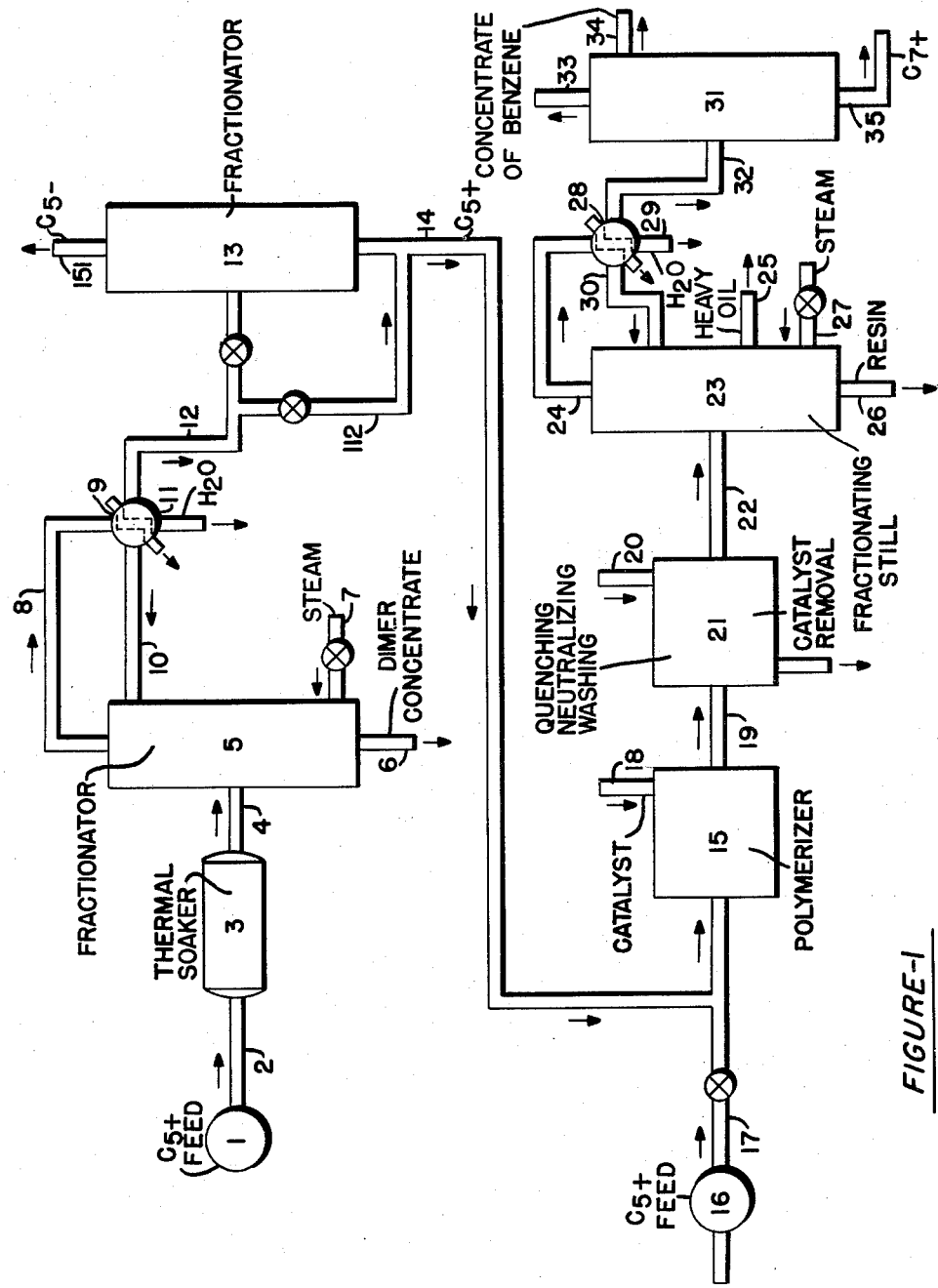

Fred W. Banes
Joseph F. Nelson   Inventors
Robert F. Leary

United States Patent Office 2,849,512
Patented Aug. 26, 1958

2,849,512

PREPARATION OF OLEFINIC-AROMATIC FEEDS FOR SOLVENT EXTRACTION

Fred W. Banes and Joseph F. Nelson, Westfield, and Robert F. Leary, Cranford, N. J., assignors to Esso Research and Engineering Company, a corporation of Delaware Application October 14, 1953, Serial No. 386,050

2 Claims. (Cl. 260—674)

This invention relates to process of treating aromatic hydrocarbon concentrates containing mainly olefinic impurities to remove such impurities that tend to react under conditions used in separating aromatics with a solvent.

Certain aromatic concentrates, e. g. of benzene, toluene, or xylenes, suitable as feed stocks for extraction or extractive distillation contain large amounts of reactive tertiary alkenes and various reactive dienes in the $C_5$ to $C_8$ range. The unsaturated hydrocarbons may constitute a major proportion of these aromatic concentrates containing about 20 to 37% by volume of the aromatic hydrocarbons and obtained by high temperature cracking processes.

The highly olefinic-aromatic concentrates can not be given a single treatment for removal of all the reactive alkenes and dienes without causing unsatisfactory losses; and on the other hand, leaving any substantial amount of the reactive impurities with the aromatics subjected to separation with a solvent leads to losses of the solvent, defective separation by the solvent, and losses of valuable olefins and aromatics when the residual reactive impurities have to be removed after extraction by drastic treatments, e. g. with concentrated sulfuric acid.

According to the present invention, distinctively improved results are obtained if certain types of dienes, particularly cycloalkadienes, are first removed from the olefinic-aromatic concentrates which are then treated with an aluminum chloride catalyst to obtain a limited and selective reaction of the alkenes present.

Although the residual conjugated dienes present are most reactive, it has been found undesirable to effect complete or maximum conversion of the dienes to resins in the aromatic concentrate. The proportion of the dienes converted to resin need be only in the region of 90 to 99% by weight.

Control of the catalytic polymerization of the dienes and alkenes in using an aluminum chloride catalyst can be determined from the extent to which the Type I alkenes are reacted. Type I alkenes are also known as alpha, primary alkenes, e. g. pentene-1, hexene-1, heptene-1, 3-methyl-hexene-1, and octene-1. Less than 20 wt. percent of these alkenes should be reacted while nearly all the dienes and a major portion of the Type III or alkenes having tertiary carbon constituents connected by double bonds are converted to resins of high softening point (about 80° C. or higher), and other high boiling substances. The types of olefins herein designated are in accordance with the classification of Schmidt and Boord, J. A. C. S. vol. 54, page 751.

To accomplish the controlled conversion of dienes and tertiary alkenes to resins with limited reaction of the alpha, primary alkenes, the olefinic-aromatic concentrates are treated with 0.25 to 2.0 wt. percent $AlCl_3$ at temperatures of —10° to 70° C., preferably 0° to 60° C.

Fig. 1 of the drawing shows graphically how the limits of conversion are determined.

The degree of conversion is most important. This is dependent on catalyst concentration, and contact time. These two variables being held constant, conversion is not affected greatly by temperature over the range of 0° to 60° C.

The preferred overall operation will be described with reference to the attached drawing which shows diagrammatically steps and means used in a flow plan shown in Figure 2.

The feed stock from tank 1 containing $C_5$–$C_8$ aromatic, diene, and alkene hydrocarbons, is first passed by line 2 into soaking vessel 3 for thermal soaking. This kind of feed stock is a fraction obtained by cracking of naphtha and higher boiling petroleum stocks at high temperatures of 1000° to 1500° F. (538° C. to 816° C.) generally under low total pressures of 1 to 10 atms, with steam or inert gas as a diluent.

The feed stock containing a substantial amount of cyclic dienes is thermally soaked, as in vessel 3, at temperatures of about 80° C. to about 120° C. for a sufficient period, 4 to 20 hours, to dimerize the cyclic dienes selectively.

The dimerized cyclic dienes removed with unreacted hydrocarbons by effluent line 4 are separated by distilling the unreacted $C_5$–$C_8$ hydrocarbons therefrom in fractionating column 5. This distillation is carried out under atmospheric or subatmospheric pressures to minimize depolymerization. The pot or bottoms temperature should not exceed 140° C. for leaving a $C_{10}+$ bottoms to be withdrawn by line 6. Preferably, steam at 100 to 140° C. is injected by line 7 to help control temperatures and lower the hydrocarbon partial pressure.

The $C_5$–$C_8$ distillate is taken overhead from column 5 by line 8 to condenser and receiver 9. Reflux is passed from 9 by line 10 to column 5. Water condensate is drained by line 11. The hydrocarbon distillate is passed by line 12 to fractionating column 13.

Fractionating column 13 is used for removing all or part of the $C_5$ hydrocarbons which are lower boiling than about 38° C., for example, isoprene. It serves also to remove water from the hydrocarbon stream which yields a bottoms product to be withdrawn from fractionator 13 by line 14. Any distilled hydrocarbons, lower boiling than the aromatic hydrocarbon, and water vapor are removed overhead by line 151. In plant operation fractionator 13 is a 50-plate column operating at a 7/1 reflux ratio. The bottoms boiling principally in the range of about 38° C. to 130° C. represents a suitable feed for the subsequent aluminum chloride polymerization. On occasions it may be desirable to bypass a small portion of stream 12 around fractionator 13 by valved line 112.

In feeding the $C_5+$ bottoms, or aromatic concentrate, from fractionator 13 by line 14 to the aluminum chloride polymerization unit 15 other aromatic concentrates of similar nature, i. e. essentially freed of cyclic dienes, may be added from a source 16 through line 17. If benzene is the only aromatic to be purified and recovered, the feed stocks to the polymerizating unit 15 need have only a nominal end point of about 85° C. to 95° C.

If toluene is to be recovered also, the end point should be higher, e. g. about 116° C. Of course, if xylenes are to be recovered, the end point should be sufficiently high to have the fractions include the xylenes, e. g. in the range of 130° C. to 140° C.

Details of the aluminum chloride polymerization treatment will be discussed further, but at this point, it should be noted that the purpose of the aluminum chloride polymerization is to react particularly tertiary alkenes and conjugated dienes in such a manner as to form valuable high softening point resins without removing to any appreciable extent Type I olefins or the aromatic hydrocarbons. It has been found that the aluminum chloride polymerization treatment can be used to obtain these objectives and acts more effectively than other agents for eliminating sludge-forming substances if the prescribed steps are followed.

The aluminum chloride treatment may be carried out batchwise or continuously. It involves the addition of a proper amount of $AlCl_3$ catalyst in the range of 0.25 to 2% to the hydrocarbon mixture to be treated. The hydrocarbon-catalyst mixture is vigorously agitated for about 0.25 to 2.0 hours at —10° to 70° C., preferably at 0° to 60° C. The extent of reaction should be carefully watched to avoid excessive reaction which would cause Type I olefin and aromatic losses. To stop the reaction, reaction mixture is treated by adding a polar substance, such as water or alcohol, by line 20, and then by adding a washing agent. After washing the reaction product to remove essentially all residual catalyst and catalyst residues, the hydrocarbon product is contacted with aqueous caustic solution at temperatures of 90° to 300° C. to hydrolyze any alkyl chlorides or $AlCl_3$ hydrocarbon complexes present. The caustic treated product is passed by line 22 into a fractionating still 23. In still 23 the lightest hydrocarbons including the aromatic hydrocarbons to be recovered are taken overhead through line 24. A heavy oil side stream is of relatively low value and is preferably to be kept down in amount by avoiding excessive reaction during the polymerization. The valuable high softening point resin product is withdrawn as bottoms through line 26. Steam is injected by line 27 to aid the distillation.

The overhead aromatic concentrate is condensed in cooler 28 and settled to permit removal of water by line 29. Reflux is returned to column 23 by line 30. The remaining hydrocarbon distillate is passed on to fractionating column 31 by line 32.

Column 31, or similar fractionating equipment, is used for separating out the aromatic concentrate of suitable boiling range which is to be used in the subsequent extraction or extractive distillation. For example, in column 31, light ends containing very little benzene are removed overhead by line 33. A suitable benzene cut is withdrawn as a side stream by line 34. A suitable higher boiling aromatic concentrate, e. g. including toluene or toluene and xylenes is withdrawn as bottoms through line 35.

The composition of the olefinic-aromatic hydrocarbon feeds will vary depending on their cracking process source and precise distillation steps used in separating the fraction in the $C_5$ to $C_8$ range. These variations in the feed composition will affect the polymer product yields which can be obtained by polymerizing the reactive components. However, certain trends have been found important in limiting the type of treatment to achieve the objects that have been set forth.

As an example, a cracked hydrocarbon feed stock fraction after dimerization, fractionation, removal of part of the isoprene, and boiling in the range of 25° to 135° C. was subjected to treatments which were studied. These feed oils typically had the general specifications and compositions shown in Table I.

TABLE I

*General specifications of unsaturated naphtha feeds*

Boiling range, 20° to 140° C.: Wt. percent
I. B. P.–38° C. _____ 0–30
38–70° C. _____ 20–50
70–130° C. _____ 75–19
130° C.+ _____ 5–1

TABLE I—Continued

*General specifications of unsaturated naphtha feeds*—Con.

Composition: Wt. percent
Diolefins, conjugated [1] _____ 8–33
  Isoprene _____ 0–8
  Piperylene _____ 6–12
  Cyclopentadiene _____ 0–3
  Others _____ 2–10
Aromatics _____ 20–37
  Benzene _____ 14–25
  Others _____ 6–12
Olefins _____ 61–25
Paraffins and naphthenes _____ 1–5

[1] Total diolefins determined by chloromaleic anhydride method: (React mixture of 1.5–3.0 ml. of sample and 2.5 ml. of chloromaleic anhydride diluted with 2 ml. of benzene containing 0.1% t-butyl catechol) for 3 hours at 100° C., and steam stripping the resulting reaction mixture for 2 hours to recover HCl (1 mole/mole diolefin).

Portions of each feed were treated with different quantities of $AlCl_3$ catalyst, ranging from 0.25 to 2.5 weight percent based on the feed, to obtain varying yields of resin ranging from 17.7 to 38.0 weight percent based on the feed. These resins were recovered as bottoms by stripping the resin solutions at 270° C. under 3 to 4 mm. of mercury, i. e. to obtain resin products having softening points of 90° C.

Figure 2:
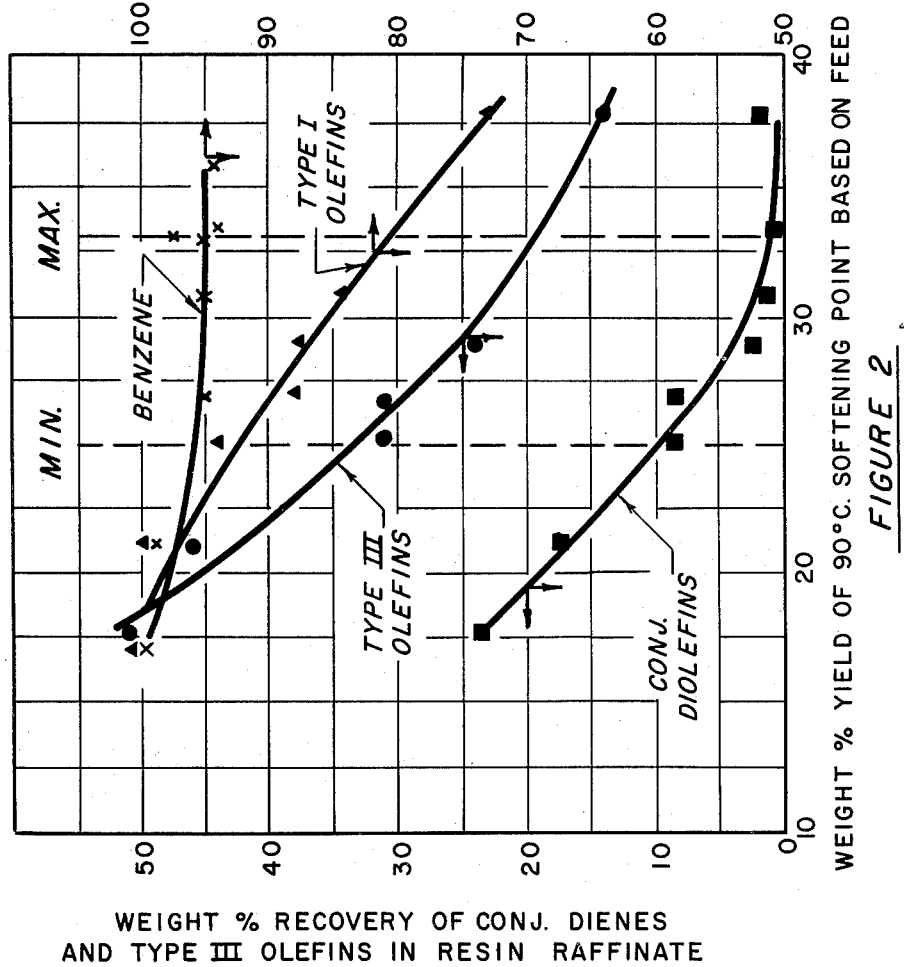

Variations in the feed compositions are to be expected, but nevertheless the changes they undergo in the process follow a definite pattern as shown in Figure 2. Typical variations in feeds prepared for the polymerization of the tertiary olefins and dienes are shown in Table II:

TABLE II

*Typical naphtha feeds prepared for polymerization*

|  | A | B | C |
|---|---|---|---|
| Dist'n range, weight percent: |  |  |  |
| I. B. P.–38° C. | 17 | 29 | 3 |
| 38–70° C. | 22 | 28 | 36.3 |
| 70–130° C. | 59 | 42 | 58.9 |
| 130° C.+ | 2 | 1 | 1.8 |
| Composition, weight, percent: |  |  |  |
| Diolefins (total) | 14.5 | 18.2 | 22.5 |
| Isoprene | 4.0 | 7.0 | 3.0 |
| Piperylene | 7.5 | 6.9 | 9.3 |
| Cyclopentadiene | 0.7 | 1.0 | 0.7 |
| Others | 2.3 | 3.3 | 9.5 |
| Aromatics | 29 | 20.2 | 27.5 |
| Benzene | 20 | 14.5 | 20.2 |
| Olefins | 55.5 | 59.6 | 47 |
| Paraffins and Naphthenes | 1 | 2 | 3 |

The raffinates stripped from the resins were fractioned and subjected to careful analysis to determine what losses of aromatics and valuable primary or Type I alkenes occurred. In these analyses, the $C_6$ fractions boiling from 50°–70° C. were isolated and analyzed for olefin types. Data was obtained to determine to the extent of diene removal affected by the polymerization. These data are summarized in the following table:

TABLE III

*Controlled recovery of polymerization products in resin formation*

| Unsaturated feed naphtha | Yield o 90° C. soft. pt. resin (weight percent on feed) | Weight percent recovery in resin raffinate ||||
|---|---|---|---|---|---|
|  |  | Benzene | Primary olefins | Conj. diolefins | Tert. olefins |
| A | 17.7 | 99–100 | 99 | 23.2 | 51 |
| A | 21.2 | 99 | 100 | 17.0 | 46 |
| A | 25.2 | 95+ | 94 | 8.6 | 31 |
| B | 26.6 | 95+ | 88 | 8.2 | 31 |
| A | 29.0 | 95+ | 87.9 | 2.0 | 24 |
| A | 30.8 | 95 | 84.3 | 1.2 |  |
| A | 33.0 | 95 |  | 0.3 |  |
| C | 37.8 | 98.5 | 73 | 1.8 | 14 |

From the data shown in Table III and Figure 2, it can be seen that the most desirable range of polymerization is in the runs where the extent of conversion to 90° C. softening point resin ranges from about 25 to 33 weight percent. Below the lower limit the reactive tertiary or Type III alkenes and dienes are not sufficiently reacted and polymerized. Above the upper limit represented by 33 wt. percent yield of resin, any further polymerization of the alkenes and dienes results in a drastic loss of the valuable primary olefins at the expense of increased amount of aluminum chloride catalyst and without benefit to the quality of the resin or aromatic recovery. Moreover, since it is a primary object to carry out a treatment which eliminates the unstable tertiary alkenes and dienes with a minimum removal of other components, the treatment which gives the higher conversion to resin, such as above 33 wt. percent, fails to make any appreciable improvement insofar as elimination of unstable conjugated dienes are concerned. With practically all the cyclic dienes first removed as dimers and polymers before the resin formation, satisfactory results are obtained in the region between vertical broken lines marked Min. on Max. on Figure 2; i. e., where 1 to 10 wt. percent of the acyclic dienes remain unreacted or where the resin yield is between 25 and 33 wt. percent based on the feed of the polymerization zone where the resin is formed.

To control the extent of alkene and diene conversion to resin, the concentration of the aluminum chloride catalyst and the contact time are the main factors to be controlled. Satisfactory treatments have used between 0.25 and 2 weight percent $AlCl_3$ and contact periods of 30 to 120 minutes to thereby recover almost quantitatively benzene with the valuable primary olefins suitably freed of the reactive alkenes and reactive dienes.

The aromatic-alkene raffinates are adequately freed of reactive alkenes and reactive dienes by comparative tests on the sludge-forming tendencies of these raffinates when treated with phenol, at the usual temperatures for stripping the hydrocarbons from phenol. These tests show that olefin-aromatic hydrocarbon streams tend to form excessive amounts of sludge where the sludge produced is 0.5 or more weight percent of the aromatics or benzene being purified. The treating steps of the present invention reduce the amount of sludge well below the 0.5 weight percent based on the aromatic hydrocarbons in contrast to other treatments which were incapable of yielding the valuable high softening point resin product with a minimum loss of the aromatic hydrocarbon and minimum loss of the valuable primary olefins.

It will be apparent that the described method of operation can be applied to any aromatic fraction boiling within the $C_5$–$C_8$ range. The end point of the feed to the polymerizer can be controlled, if desired, by imposing a fractionation on the feed to the polymerizer. The end point can be adjusted for recovering principally a benzene concentrate, a toluene concentrate or a xylene concentrate.

Having described the invention it is claimed as follows:

1. Process for selectively removing reactive dienes and tertiary alkenes from a $C_5$ to $C_8$ hydrocarbon fraction in which they are present with cyclic dienes, primary alkene and aromatic hydrocarbons, which comprises heating the fraction at about 80 to 120° C. to selectively dimerize the cyclic dienes, distilling unreacted acylic dienes, alkene and aromatic components from the dimerized cyclic dienes, removing components lower boiling than 38° C. from the distilled components by fractionation selectively polymerizing tertiary alkenes and acyclic dienes in said distilled and fractionated components boiling above 38° C. mixed with 0.25 to 2 wt. percent $AlCl_3$ at −10 to 70° C. until 1 to 10 wt. percent of the acyclic dienes remain unreacted, stopping the polymerizing before more than 20% of primary alkenes present are reacted, then distilling the remaining unreacted aromatic, acyclic diene, and alkene components from higher boiling polymers and resins formed from the tertiary alkenes and the dienes.

2. The method of separating benzene and primary alkenes from a mixture thereof containing tertiary alkenes, isoprene, piperylene, and a small amount of cyclopentadiene, which comprises fractionating said mixture to remove part of the isoprene and lower boiling components to obtain a mixture boiling above 38° C. then reacting remaining conjugated dienes and tertiary alkenes in said mixture boiling above 38° C. in the presence of 0.25 to 2 wt. percent $AlCl_3$ at −10 to 70° C. until at least 90% of said remaining dienes are polymerized to form 25 to 33 wt. percent 90° C. softening point resin based on the polymerization feed, stopping the polymerization to retain more than 80 wt. percent of the primary alkenes unreacted, and separating the benzene with the unreacted olefins from polymer oils and resins thus produced.

References Cited in the file of this patent

UNITED STATES PATENTS

| | | |
|---|---|---|
| 1,990,213 | Winkler et al. | Feb. 5, 1933 |
| 2,161,599 | Towne | June 6, 1939 |
| 2,387,993 | Hepp | Oct. 30, 1945 |
| 2,400,355 | Jones et al. | May 14, 1946 |
| 2,413,260 | Soday | Dec. 24, 1946 |
| 2,733,285 | Hamner | Jan. 31, 1956 |
| 2,734,046 | Nelson et al. | Feb. 7, 1956 |